US011759703B2

(12) United States Patent
Su (10) Patent No.: US 11,759,703 B2
(45) Date of Patent: Sep. 19, 2023

(54) GAMING CONTROLLER (71) Applicant: Primax Electronics Ltd., Taipei (TW)

(72) Inventor: Dong-Xu Su, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 138 days.

(21) Appl. No.: 17/578,192

(22) Filed: Jan. 18, 2022

(65) Prior Publication Data

US 2023/0191242 A1 Jun. 22, 2023

(30) Foreign Application Priority Data

Dec. 17, 2021 (CN) .......................... 202111552359.6

(51) Int. Cl.
*A63F 13/24* (2014.01)
(52) U.S. Cl.
CPC ...... *A63F 13/24* (2014.09); *A63F 2300/1043* (2013.01)
(58) Field of Classification Search
None
See application file for complete search history.

(56) References Cited

U.S. PATENT DOCUMENTS

| 8,523,675 | B2 * | 9/2013 | Young | A63F 13/24 |
| | | | | 273/148 R |
| 2005/0255915 | A1 * | 11/2005 | Riggs | A63F 13/24 |
| | | | | 463/37 |
| 2020/0179799 | A1 * | 6/2020 | Ramcheran | A63F 13/98 |
| 2020/0218305 | A1 * | 7/2020 | Chan | G05G 1/06 |

* cited by examiner

*Primary Examiner* — Peter J Iannuzzi
(74) *Attorney, Agent, or Firm* — KIRTON McCONKIE; Evan R. Witt (57) ABSTRACT

A gaming controller includes a first sliding block, a second sliding block, an operation module and a bracket. The first and second sliding blocks include first and second tapped holes, respectively. Moreover, first and second through-holes are respectively formed in a bottom plate of the bracket. A first pivotal hole and a second pivotal hole are respectively formed in first and second top structures of the bracket. A first bolt is penetrated through the first through-hole and the first tapped hole and tightened into the first pivotal hole. A second bolt is penetrated through the second through-hole and the second tapped hole and tightened into the second pivotal hole. As the first bolt and the second bolt are rotated, the first sliding block, the operation module and the second sliding block are moved between the first top structure or the second top structure and the bottom plate.

10 Claims, 11 Drawing Sheets

GAMING CONTROLLER

FIELD OF THE INVENTION

The present invention relates to a gaining controller, and more particularly to a gaining controller with a height-adjustable operation module.

BACKGROUND OF THE INVENTION

Recently, the video game and e-sports industries are developed vigorously. Consequently, many video game companies are also continuously developing new next-generation consoles. For example, a Wii console was developed by Nintendo, a PlayStation console was developed by Sony, or an Xbox console was developed by Microsoft. Regardless of the development of the game console, a gaming controller is still one of the necessary input devices for various game consoles. The user can hold and operate the gaming controller to play the video games.

In accordance with the existing technologies, the gaining controllers of various game consoles are gradually designed according to the ergonomic demands. Generally, the palm sizes and the finger lengths of different users are different. Since the gaining controller has a fixed size, the gaining controller may only comply with the palms and fingers of specified users. In other words, the size of the gaining controller fails to comply with the operating requirements or preferences of some users.

For solving the drawbacks of the conventional technologies, it is important to provide an improved gaining controller in order to comply with the operating requirements or preferences of different users.

SUMMARY OF THE INVENTION

An object of the present invention provides a gaining controller. The vertical height of an operation module of the gaining controller is adjustable. When the gaining controller is used by any user, the user may adjust the vertical height of the operation module according to the operating requirement or the preference of the user. Consequently, during the process of playing games with the gaining controller, the satisfactory operating feel can be maintained.

In accordance with an aspect of the present invention, a gaming controller is provided. The gaming controller includes a casing, a first sliding block, a second sliding block, an operation module, a bracket, a first bolt and a second bolt. The casing includes an opening. The first sliding block includes a first clamping structure and a first main body. The first clamping structure includes a first sliding groove. The first main body includes a first tapped hole. The second sliding block includes a second clamping structure and a second main body. The second clamping structure includes a second sliding groove. The second main body includes a second tapped hole. A portion of the operation module is disposed within the casing. Another portion of the operation module is exposed outside through the opening. The operation module includes a directional key and a base. The directional key is installed on the base. The base is arranged between the first sliding block and the second sliding bock. The base includes a top wall, a first lateral wall and a second lateral wall. The first lateral wall and the second lateral wall are connected with the top wall. The first lateral wall and the second lateral wall are opposed to each other. A first protrusion post is formed on the first lateral wall. The first protrusion post is installed in the first sliding groove. The second protrusion post is formed on the second lateral wall. The second protrusion post is installed in the second sliding groove. The first sliding block, the second sliding block and the operation module are installed on the bracket. The bracket includes a bottom plate, a first lateral structure, a second lateral structure, a first top structure and a second top structure. The first lateral structure is connected with the first top structure and the bottom plate. The second lateral structure is connected with the second top structure and the bottom plate. A first through-hole and a second through-hole are formed in the bottom plate. A first pivotal hole is formed in the first top structure. A second pivotal hole is formed in the second top structure. The first bolt is penetrated through the first through-hole and the first tapped hole and tightened into the first pivotal hole. The second bolt is penetrated through the second through-hole and the second tapped hole and tightened into the second pivotal hole. As the first bolt and the second bolt are rotated, the first sliding block, the operation module and the second sliding block are moved upwardly or downwardly between the first top structure and the bottom plate or between the second top structure and the bottom plate.

In an embodiment, the gaming controller further includes a first metallic guide track, a second metallic guide track, a third metallic guide track and a fourth metallic guide track. The first metallic guide track and the second metallic guide track are installed between the first top structure and the bottom plate. The third metallic guide track and the fourth metallic guide track are installed between the second top structure and the bottom plate.

In an embodiment, a third through-hole and a fourth through-hole are formed in the first top structure, a fifth through-hole and a sixth through-hole are formed in the second top structure, and a third pivotal hole, a fourth pivotal hole, a fifth pivotal hole and a sixth pivotal hole are formed in the bottom plate. The first metallic guide track is penetrated through the third through-hole and installed in the third pivotal hole. The second metallic guide track is penetrated through the fourth through-hole and installed in the fourth pivotal hole. The third metallic guide track is penetrated through the fifth through-hole and installed in the fifth pivotal hole. The fourth metallic guide track is penetrated through the sixth through-hole and installed in the sixth pivotal hole.

In an embodiment, the bracket is made of a metallic material. The first metallic guide track is welded in the third through-hole or the third pivotal hole. The second metallic guide track is welded in the fourth through-hole or the fourth pivotal hole. The third metallic guide track is welded in the fifth through-hole or the fifth pivotal hole. The fourth metallic guide track is welded in the sixth through-hole or the sixth pivotal hole.

In an embodiment, the first sliding block further includes a first guiding structure, and the second sliding block includes a second guiding structure. The first guiding structure is arranged between the first clamping structure and the first main body. The first guiding structure is clamped between the first metallic guide track and the second metallic guide track. The second guiding structure is arranged between the second clamping structure and the second main body. The second guiding structure is clamped between the third metallic guide track and the fourth metallic guide track.

In an embodiment, the first guiding structure and the second guiding structure are concave structures.

In an embodiment, the gaming controller further includes a first motor and a second motor. The first motor is located under the first through-hole to drive rotation of the first bolt.

The second motor is located under the second through-hole to drive the rotation of the second bolt.

In an embodiment, the gaming controller further includes an adjusting switch. The first motor and the second motor are controlled by operating the adjusting switch. The adjusting switch is exposed outside the casing.

In an embodiment, the first protrusion post and the second protrusion post are studs. A seventh through-hole is formed in the first sliding groove. An eighth through-hole is formed in the second sliding groove. The gaming controller further includes a first screw and a second screw. After the first screw is penetrated through the seventh through-hole and fixed in the first protrusion post, the base is fixed on the first sliding block. After the second screw is penetrated through the eighth through-hole and fixed in the second protrusion post, the base is fixed on the second sliding block.

In an embodiment, the directional key includes a keycap, a key frame and a circuit board. An installation hole is formed in a bottom surface of the keycap. A pressing post is formed on the bottom surface of the keycap. The key frame includes an accommodation space and a first stud. The keycap is disposed within the accommodation space. The circuit board includes a positioning structure and a switch element. When the pressing post is pressed down, the switch element is triggered by the pressing post. The base includes a fixing post and a ninth through-hole. The fixing post is protruded from the top wall. The ninth through-hole is formed in the top wall. The fixing post is inserted into the installation hole of the keycap. The operation module further includes a third screw. The third screw is penetrated through the ninth through-hole and the positioning structure and fixed in the first stud. Consequently, the key frame and the circuit board are fixed on the base.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. In the following embodiments, the technical features of the present invention and the achievable technical effects will be described.

Figure 1:
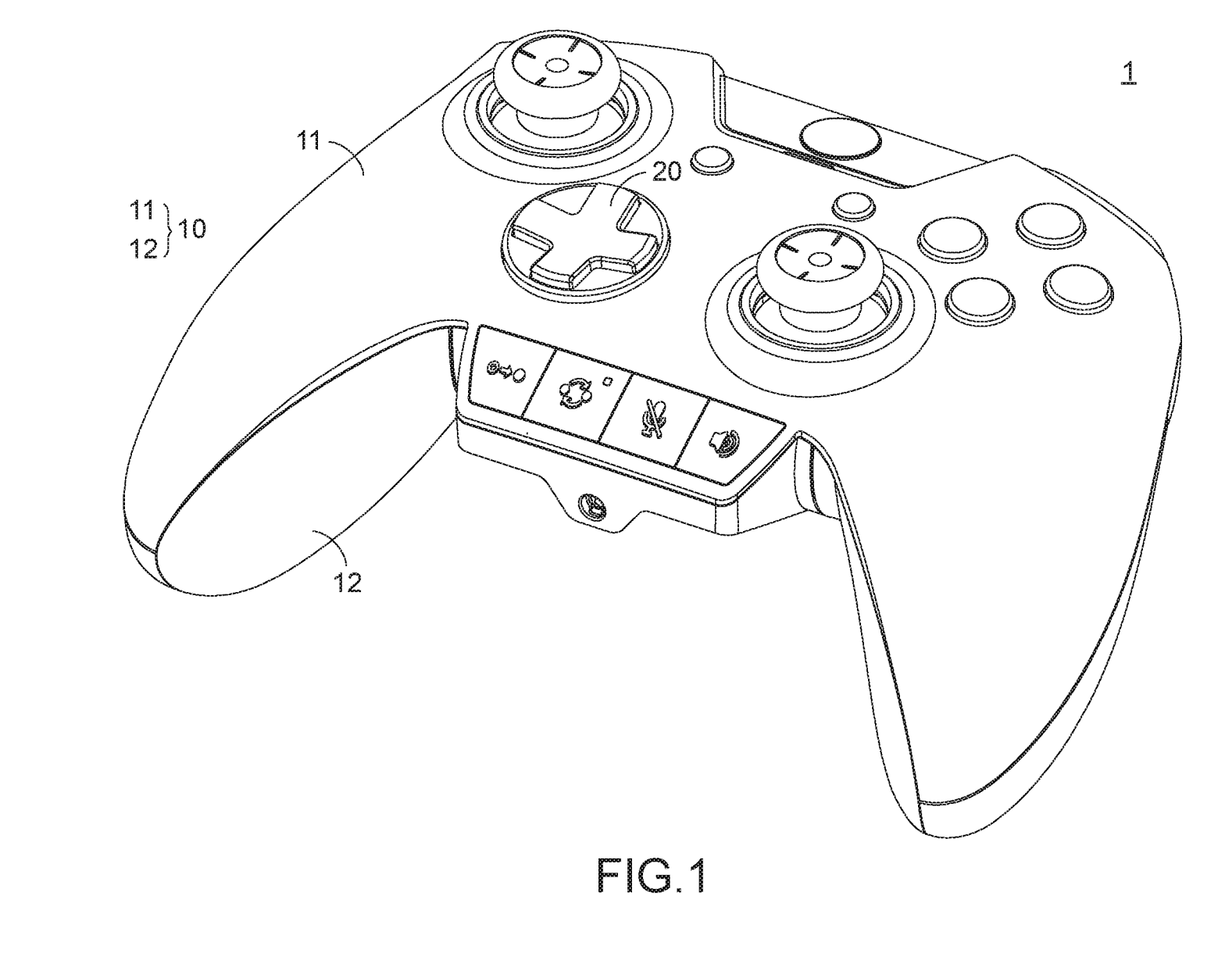
FIG. 1 is a schematic perspective view illustrating a gaining controller according to an embodiment of the present invention.
Figure 2:
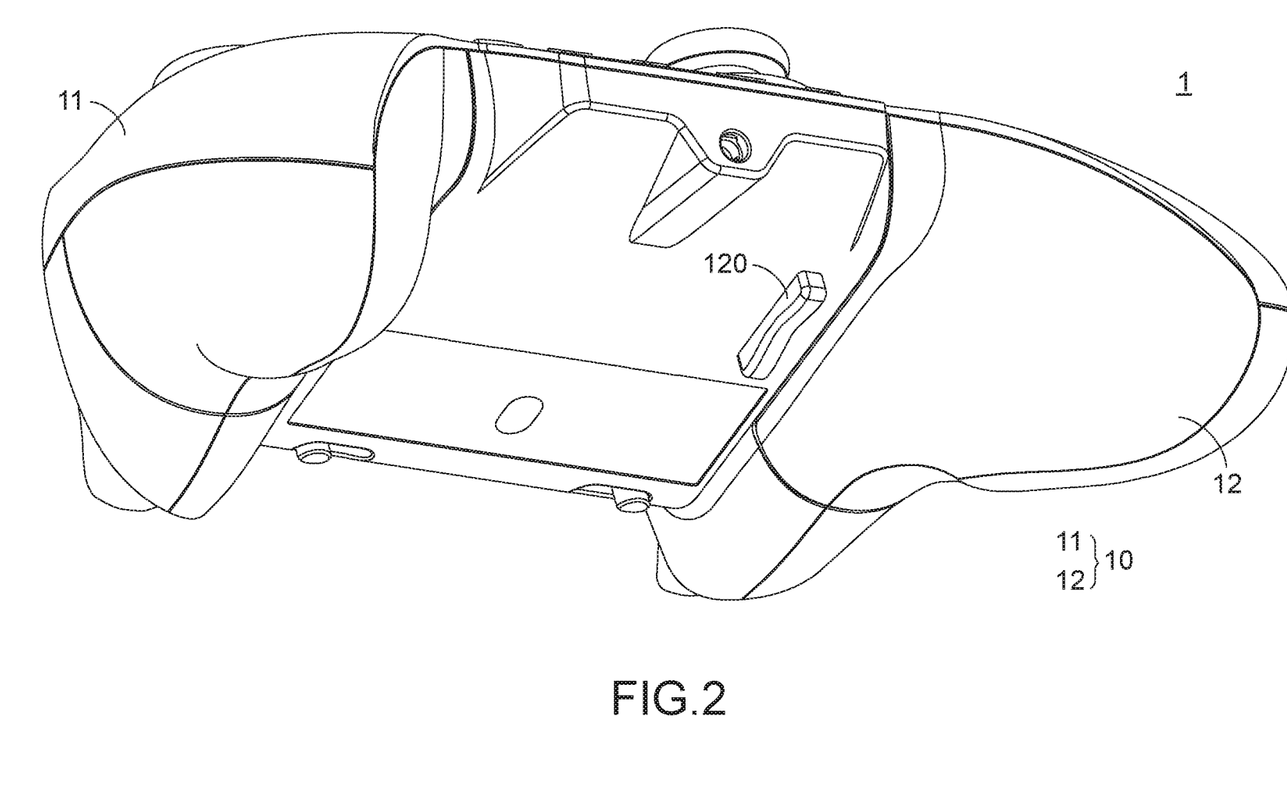
FIG. 2 is a schematic perspective view illustrating the gaining controller as shown in FIG. 1 and taken along another viewpoint.
Figure 3:
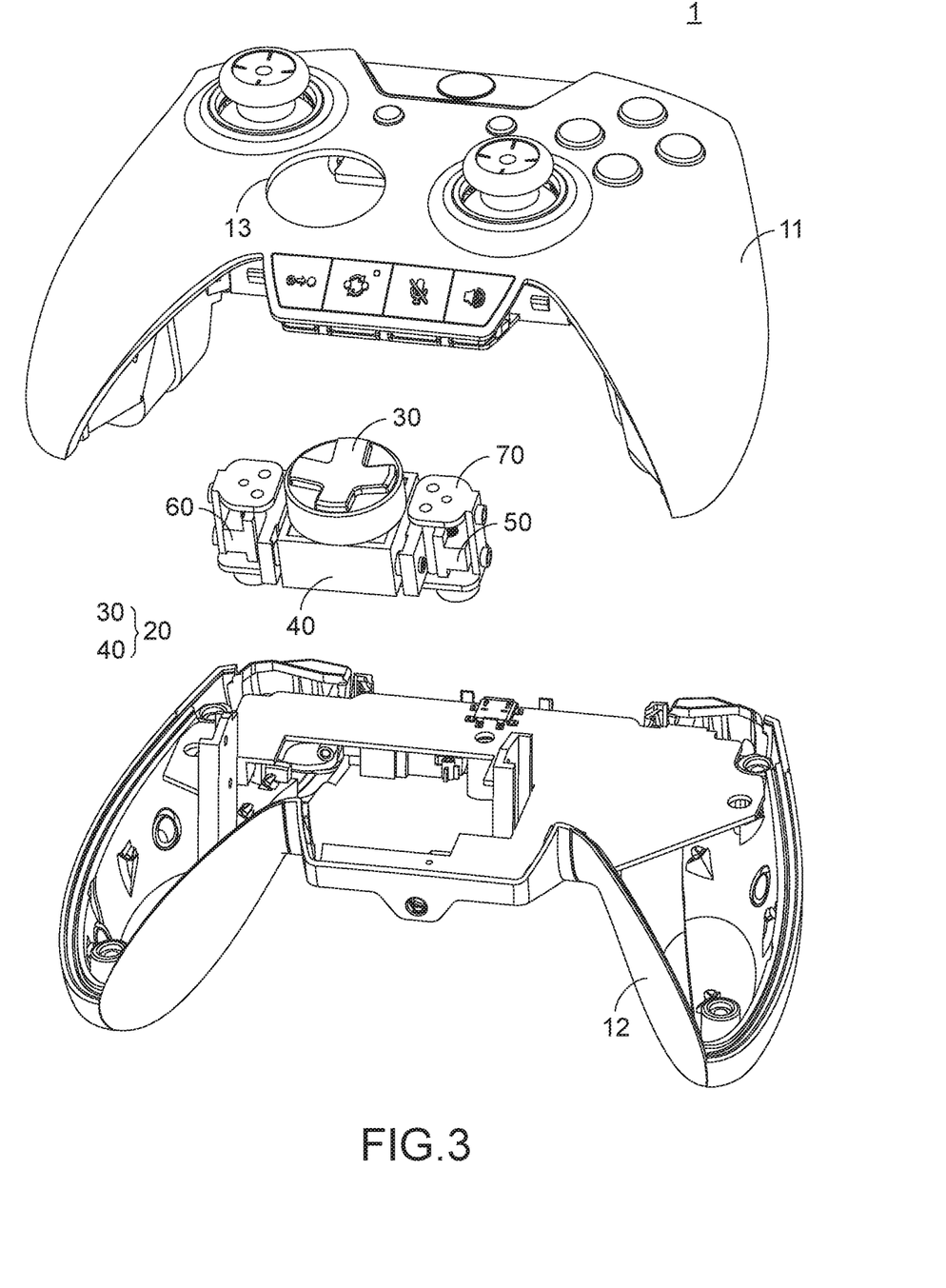
FIG. 3 is a schematic exploded view illustrating the gaining controller as shown in FIG. 1.

The present invention provides a gaining controller. FIG. 1 is a schematic perspective view illustrating a gaining controller according to an embodiment of the present invention. FIG. 2 is a schematic perspective view illustrating the gaming controller as shown in FIG. 1 and taken along another viewpoint. FIG. 3 is a schematic exploded view illustrating the gaming controller as shown in FIG. 1. As shown in FIGS. 1, 2 and 3, the gaining controller 1 comprises a casing 10. In an embodiment, the casing 10 is a combination of an upper cover 11 and a lower cover 12. It is noted that numerous modifications and alterations may be made while retaining the teachings of the invention. For example, in another embodiment, the casing 10 is a combination of more than two components. Moreover, the casing 10 comprises an opening 13. For example, the opening 13 is formed in the upper cover 11. The gaining controller 1 further comprises an operation module 20. A portion of the operation module 20 is disposed within the casing 10. Another portion of the operation module 20 is exposed outside through the opening 13 in order to be operated by the user.

Figure 4:
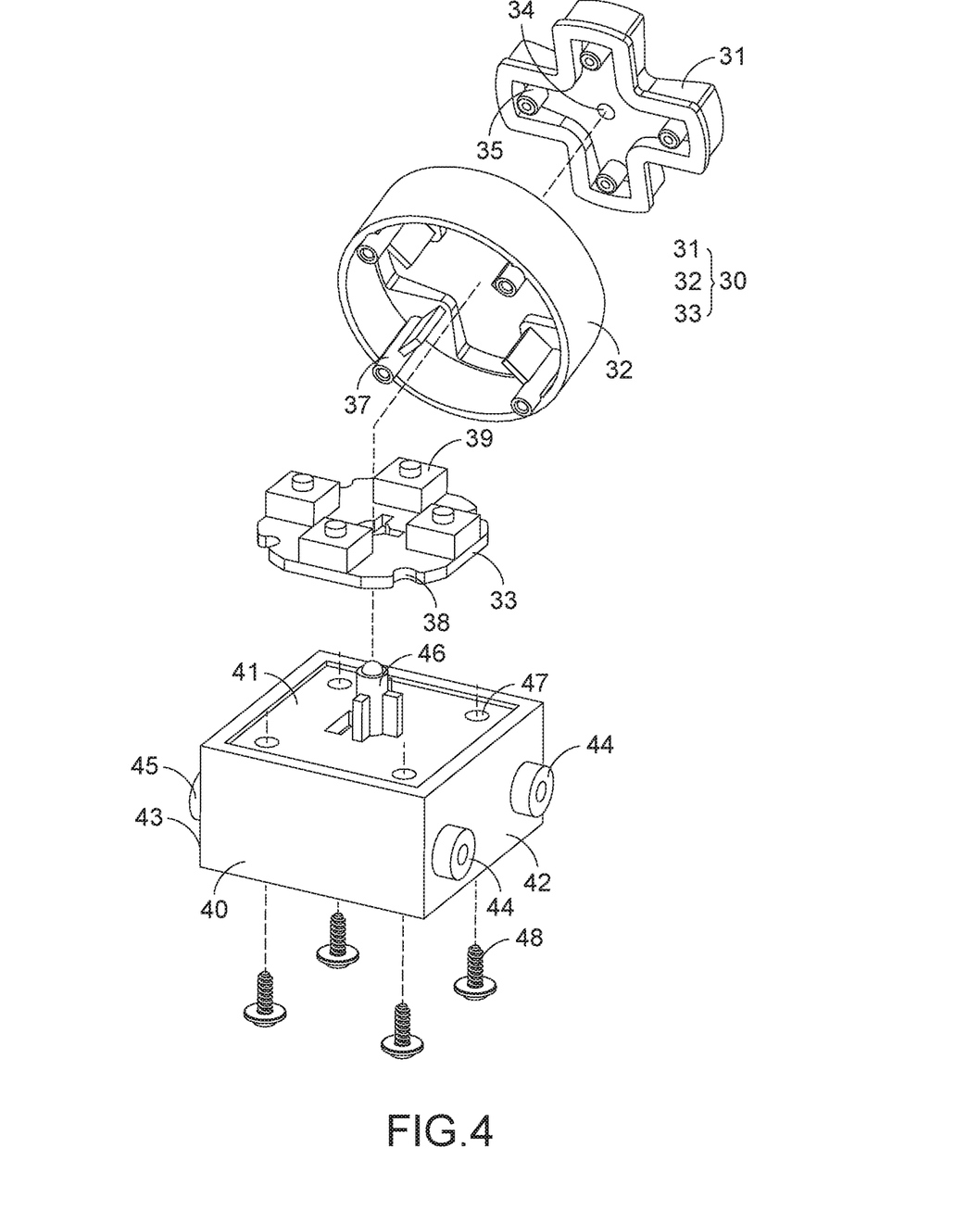
FIG. 4 is a schematic exploded view illustrating the operation module of the gaining controller according to the embodiment of the present invention.
Figure 5:
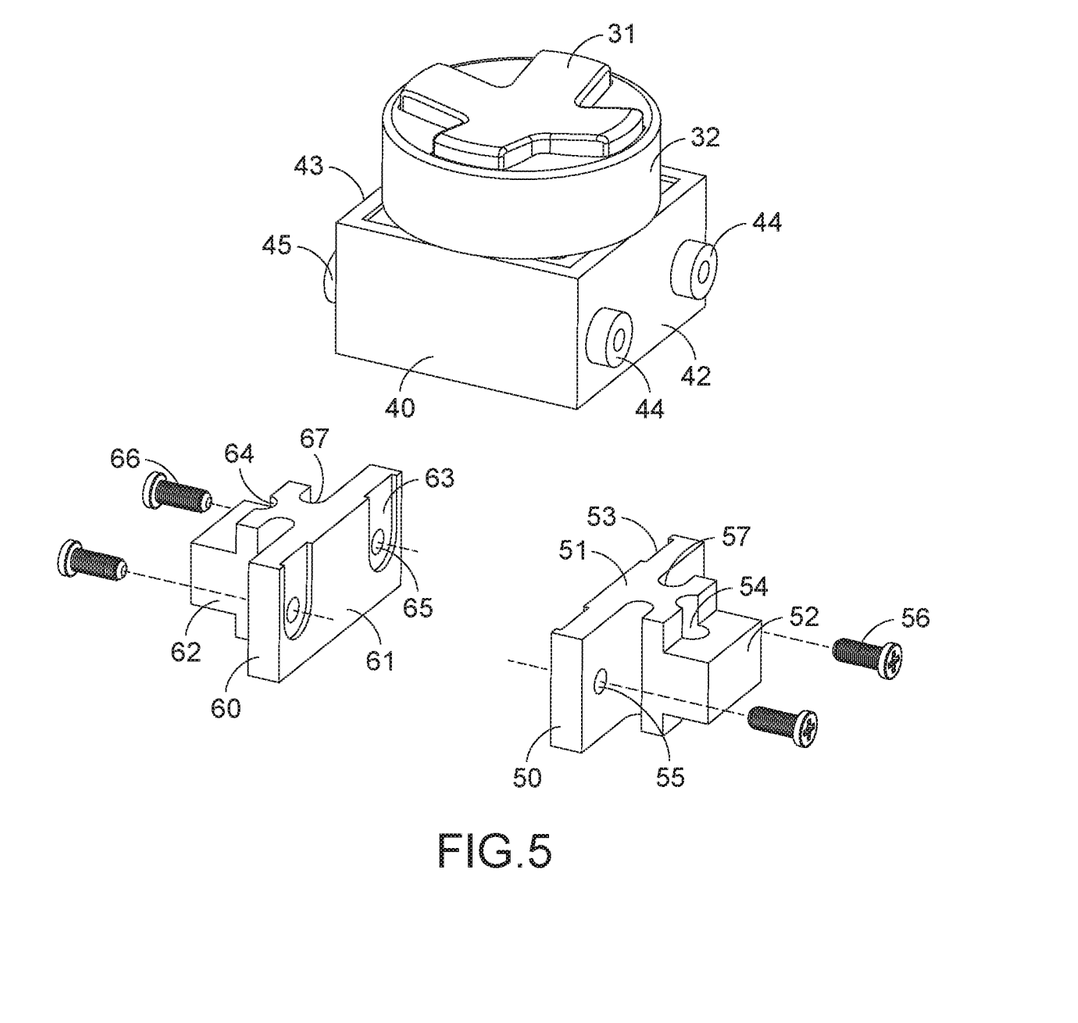
FIG. 5 is a schematic perspective view illustrating the assembled structure of the operation module of the gaining controller according to the embodiment of the present invention.

FIG. 4 is a schematic exploded view illustrating the operation module of the gaining controller according to the embodiment of the present invention. FIG. 5 is a schematic perspective view illustrating the assembled structure of the operation module of the gaining controller according to the embodiment of the present invention. As shown in FIGS. 4 and 5, the operation module 20 comprises a directional key 30 and a base 40. The directional key 30 is installed on the base 40. In an embodiment, the directional key 30 comprises a keycap 31, a key frame 32 and a circuit board 33. An installation hole 34 is formed in the bottom surface of the keycap 31. At least one pressing post 35 is formed on the bottom surface of the keycap 31. The key frame 32 comprises an accommodation space 36 and at least one first stud 37. The keycap 31 is disposed within the accommodation space 36. The circuit board 33 comprises at least one positioning structure 38 and at least one switch element 39. The positioning structure 38 is a notch or a through-hole. When the keycap 31 is pressed down, the pressing post 35 is correspondingly moved downwardly to trigger the corresponding switch element 39. In some other embodiments, the directional key 30 is replaced by another appropriate key or another input mechanism (e.g., a joystick).

In an embodiment, the base 40 comprises a top wall 41, a first lateral wall 42 and a second lateral wall 43. The first lateral wall 42 and the second lateral wall 43 are connected with the top wall 41. In addition, the first lateral wall 42 and the second lateral wall 43 are opposed to each other. Moreover, at least one first protrusion post 44 is formed on the first lateral wall 42, and at least one second protrusion post 45 is formed on the second lateral wall 43.

The base 40 further comprises a fixing post 46 and at least one ninth through-hole 47. The fixing post 46 is protruded from the top wall 41. The at least one ninth through-hole 47 is formed in the top wall 41. The fixing post 46 is inserted into the installation hole 34 of the keycap 31. The operation module 20 further comprises at least one third screw 48. After the third screw 48 is penetrated through the corresponding ninth through-hole 47 and the corresponding positioning structure 38 and fixed in the corresponding first stud 37, the key frame 32 and the circuit board 33 are fixed on the base 40.

In an embodiment of the gaining controller 1, the vertical height of the operation module 20 is adjustable through the cooperation of a first sliding block 50, a second sliding block 60, a bracket 70, a first bolt 90 and a second bolt 91. The structures of these components and the assembling relationships between these components will be described as follows.

Figure 6:
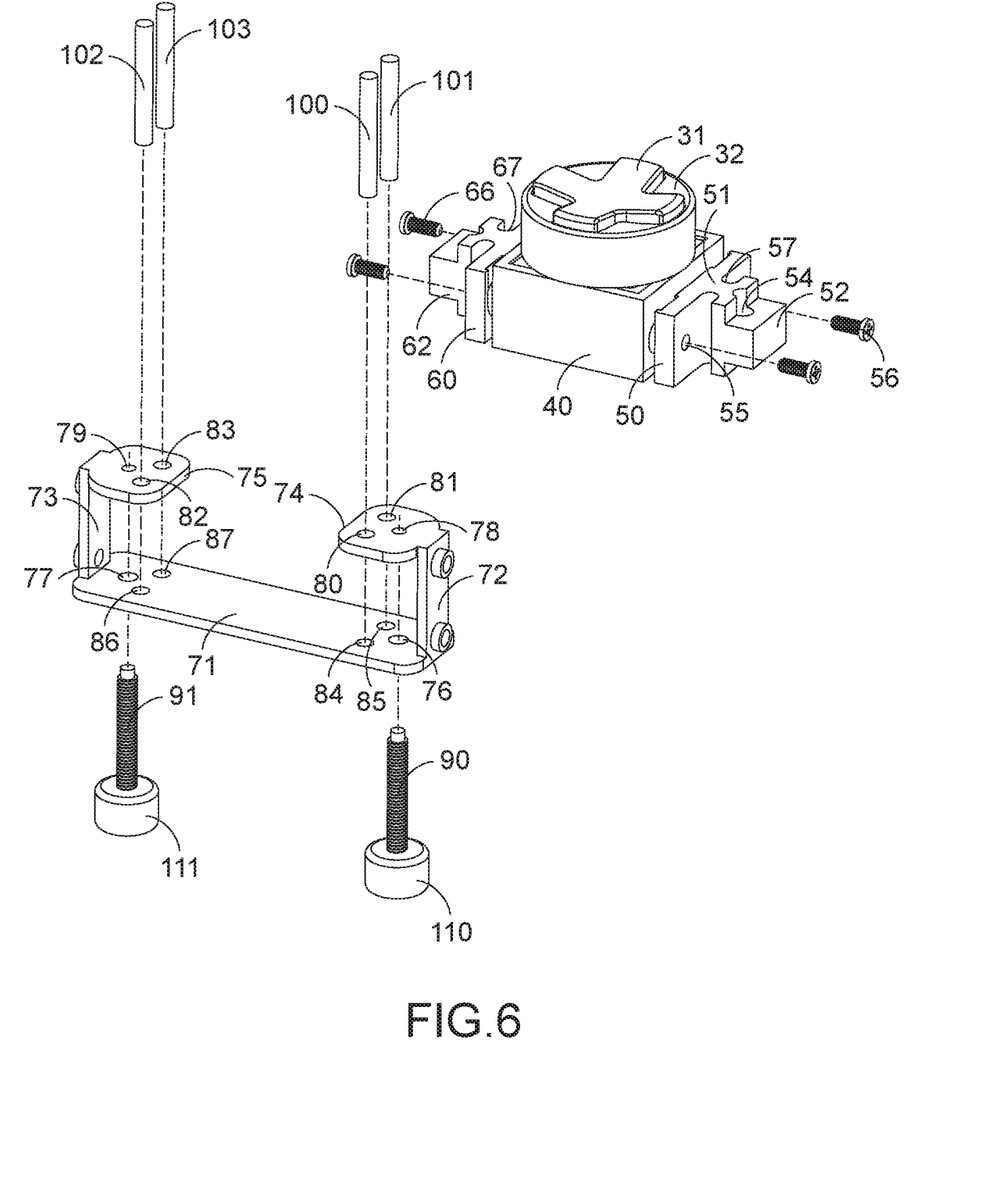
FIG. 6 is a schematic perspective view illustrating the relationship between the operation module, the first sliding block and the second sliding block of the gaining controller according to embodiment of the present invention.
Figure 7:
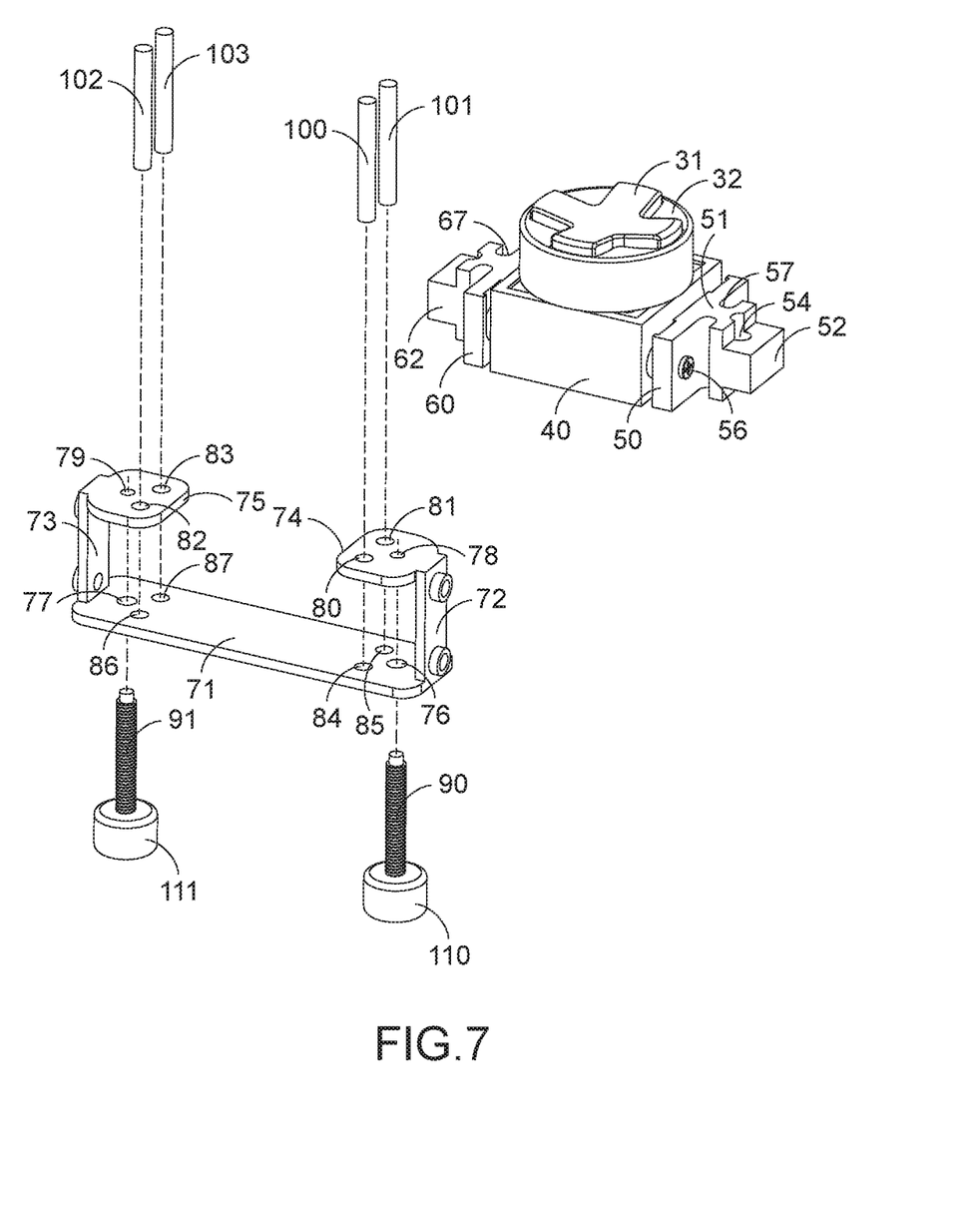
FIG. 7 is a schematic perspective view illustrating the assembled structure of the operation module, the first sliding block and the second sliding block of the gaining controller according to embodiment of the present invention.

FIG. 6 is a schematic perspective view illustrating the relationship between the operation module, the first sliding block and the second sliding block of the gaining controller according to embodiment of the present invention. FIG. 7 is a schematic perspective view illustrating the assembled structure of the operation module, the first sliding block and the second sliding block of the gaining controller according to embodiment of the present invention. Please refer to FIGS. 5, 6 and 7. The first sliding block 50 comprises a first clamping structure 51 and a first main body 52. The first clamping structure 51 comprises at least one first sliding groove 53. The first main body 52 comprises a first tapped hole 54. Similarly, the second sliding block 60 comprises a second clamping structure 61 and a second main body 62. The second clamping structure 61 comprises at least one second sliding groove 63. The second main body 62 comprises a second tapped hole 64.

The base 40 of the operation module 20 is arranged between the first sliding block 50 and the second sliding block 60. The first protrusion post 44 of the base 40 is installed in the corresponding first sliding groove 53. The second protrusion post 45 of the base 40 is installed in the corresponding second sliding groove 63. Preferably but not exclusively, the first protrusion post 44 and the second protrusion post 45 are studs. A seventh through-hole 55 is formed in the first sliding groove 53 of the first sliding block 50. An eighth through-hole 65 is formed in the second sliding groove 63 of the second sliding block 60. The gaining controller 1 further comprises at least one first screw 56 and at least one second screw 66. After the first screw 56 is penetrated through the corresponding seventh through-hole 55 and fixed in the corresponding first protrusion post 44, the base 40 is fixed on the first sliding block 50. After the second screw 66 is penetrated through the corresponding eighth through-hole 65 and fixed in the corresponding second protrusion post 45, the base 40 is fixed on the second sliding block 60.

It is noted that the process of assembling the operation module 20, the first sliding block 50, the second sliding block 60 and the bracket 70 of the gaining controller 1 is not restricted. In an embodiment, the operation module 20 is firstly assembled with the first sliding block 50 and the second sliding block 60, and then the combination of the operation module 20, the first sliding block 50 and the second sliding block 60 is assembled with the bracket 70. In another embodiment, the first sliding block 50 and the second sliding block 60 are firstly assembled with the bracket 70, and then the operation module 20 is assembled with the first sliding block 50 and the second sliding block 60.

Figure 8:
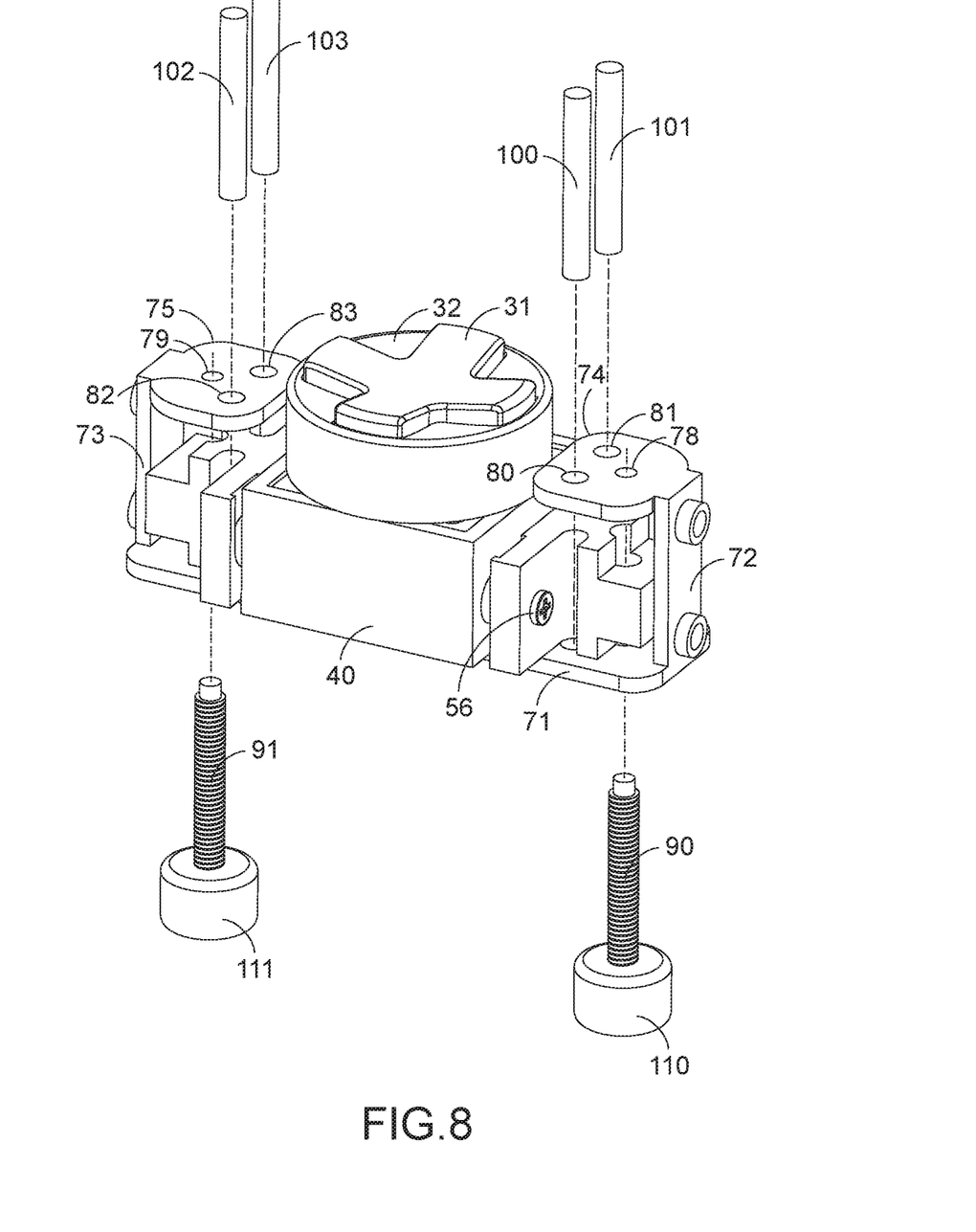
FIG. 8 is a schematic perspective view illustrating the relationship between the operation module, the first sliding block, the second sliding block and the bracket of the gaining controller according to embodiment of the present invention.
Figure 9:
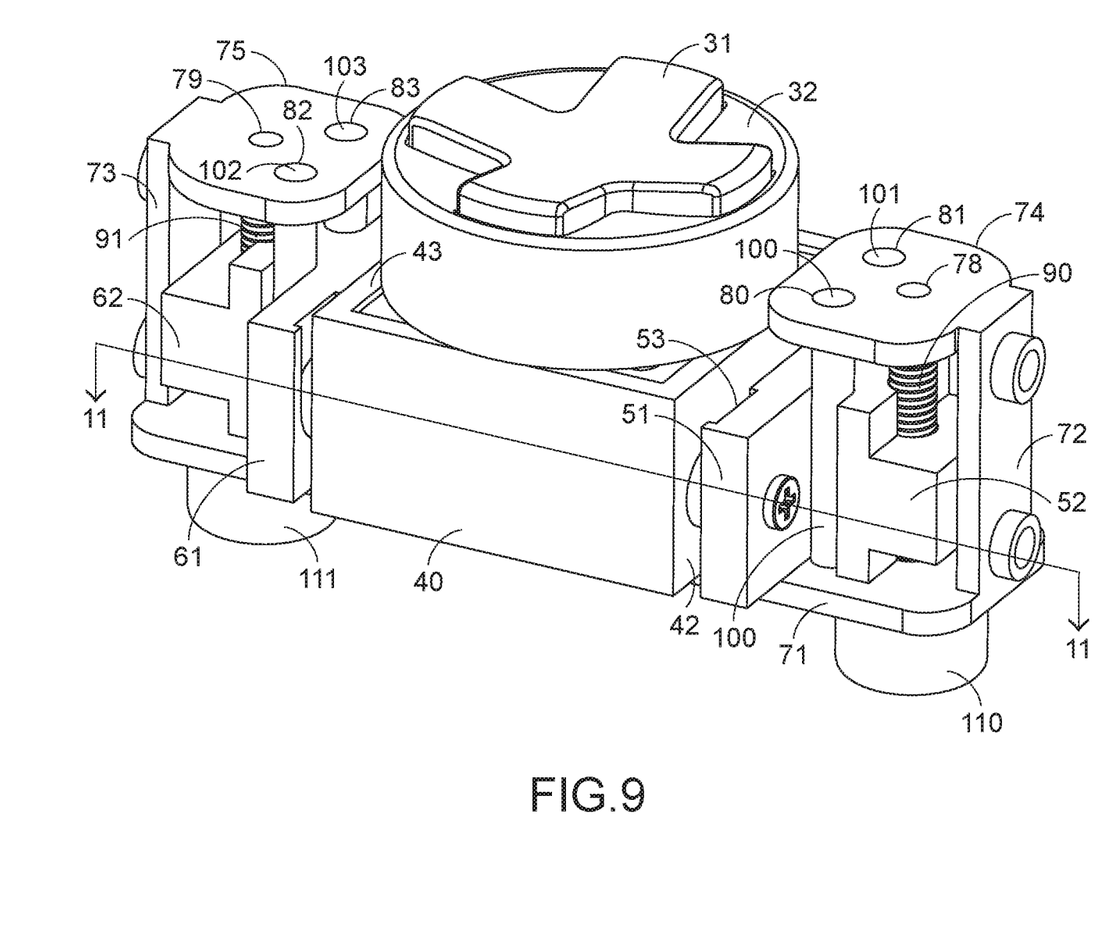
FIG. 9 is a schematic perspective view illustrating the assembled structure of the operation module, the first sliding block, the second sliding block and the bracket of the gaining controller according to embodiment of the present invention.
Figure 10:
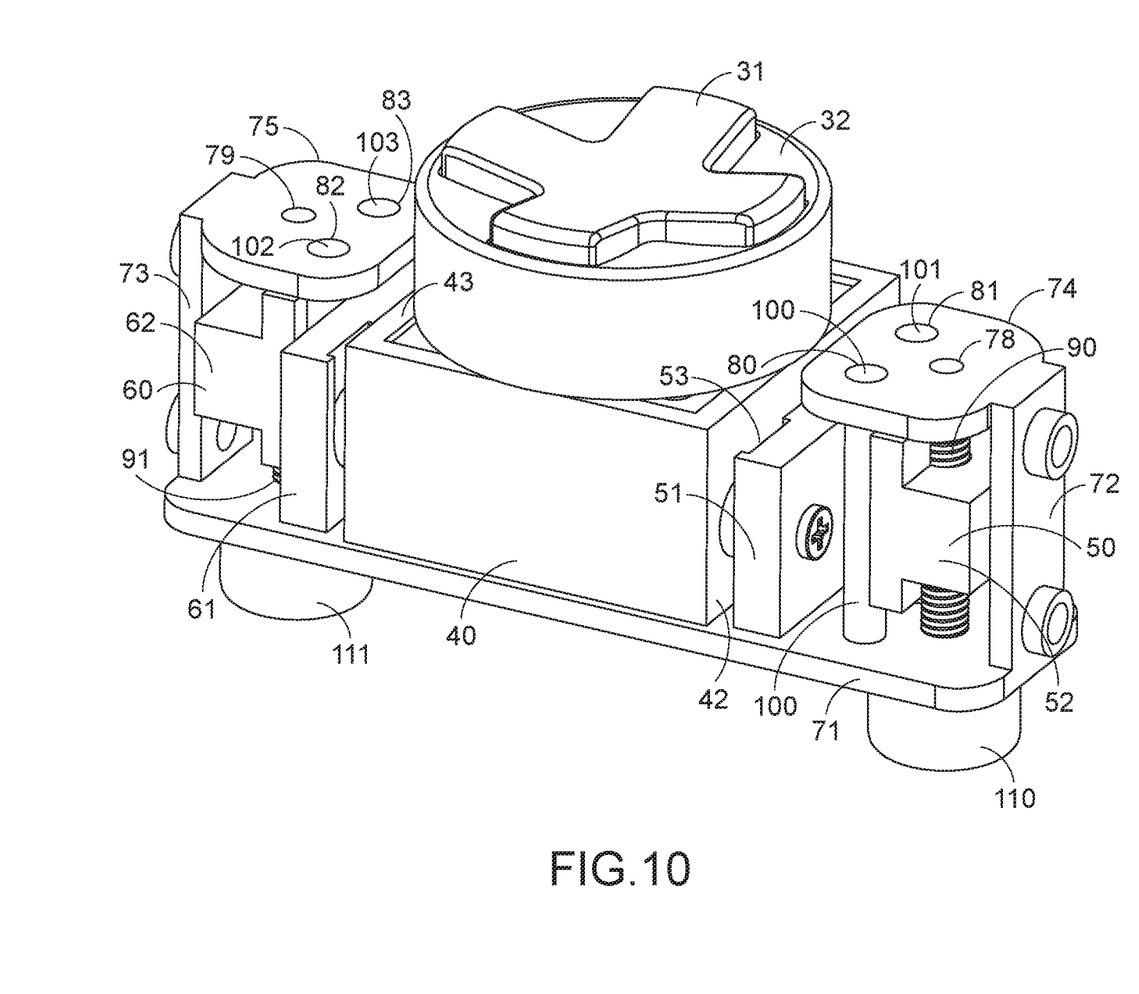
FIG. 10 is a schematic perspective view illustrating the combination of the operation module, the first sliding block and the second sliding block after the vertical height is adjusted.

FIG. 8 is a schematic perspective view illustrating the relationship between the operation module, the first sliding block, the second sliding block and the bracket of the gaining controller according to embodiment of the present invention. FIG. 9 is a schematic perspective view illustrating the assembled structure of the operation module, the first sliding block, the second sliding block and the bracket of the gaining controller according to embodiment of the present invention. FIG. 10 is a schematic perspective view illustrating the combination of the operation module, the first sliding block and the second sliding block after the vertical height is adjusted. Please refer to FIGS. 7, 8, 9 and 10. The bracket 70 is configured to install the first sliding block 50, the second sliding block 60 and the operation module 20 thereon. The bracket 70 is installed and fixed in the inner portion of the casing 10. In an embodiment, the bracket 70 comprises a bottom plate 71, a first lateral structure 72, a second lateral structure 73, a first top structure 74 and a second top structure 75. The first lateral structure 72 and the second lateral structure 73 are located at two ends of the bottom plate 71, respectively. The first lateral structure 72 is connected with the first top structure 74 and the bottom plate 71. The second lateral structure 73 is connected with the second top structure 75 and the bottom plate 71. A first through-hole 76 and a second through-hole 77 are formed in the bottom plate 71. A first pivotal hole 78 is formed in the first top structure 74. A second pivotal hole 79 is formed in the second top structure 75. Preferably but not exclusively, the first pivotal hole 78 and the second pivotal hole 79 are through-holes or blind holes. It is noted that the examples of the first pivotal hole 78 and the second pivotal hole 79 are not restricted.

Please refer to FIG. 8. After the first sliding block 50 and the second sliding block 60 are disposed within the bracket 70, the first bolt 90 is penetrated through the first through-hole 76 of the bracket 70 and the first tapped hole 54 of the first sliding block 50 sequentially and tightened into the first pivotal hole 78 of the bracket 70. Consequently, the first sliding block 50 is installed on the bracket 70. Similarly, the second bolt 91 at another side is penetrated through the second through-hole 77 of the bracket 70 and the second tapped hole 64 of the second sliding block 60 sequentially and tightened into the second pivotal hole 79 of the bracket 70. Consequently, the second sliding block 60 is installed on the bracket 70.

As mentioned above, the first bolt 90 and the second bolt 91 are respectively engaged with the first tapped hole 54 of the first sliding block 50 and the second tapped hole 64 of the second sliding block 60. Consequently, as the first bolt 90 and the second bolt 91 are rotated, the first sliding block 50, the operation module 20 and the second sliding block 60 can be moved upwardly or downwardly between the first top structure 74 and the bottom plate 71 or between the second top structure 75 and the bottom plate 71. For example, as shown in FIG. 9, the first sliding block 50, the operation module 20 and the second sliding block 60 are moved to the position closest to the bottom plate 71 of the bracket 70. Meanwhile, the first clamping structure 51 and the second clamping structure 61 are attached on the bottom plate 71 of the bracket 70. As shown in FIG. 10, the first sliding block 50, the operation module 20 and the second sliding block 60 are moved to the position closest to the first top structure 74 and the second top structure 75 of the bracket 70. Meanwhile, the first clamping structure 51 and the second clamping structure 61 are respectively attached on the first top structure 74 and the second top structure 75 of the bracket 70.

For allowing the first sliding block 50, the operation module 20 and the second sliding block 60 to be smoothly moved, the structures of the bracket 70, the first sliding block 50 and the second sliding block 60 of the gaining controller 1 are specially designed.

Figure 11:
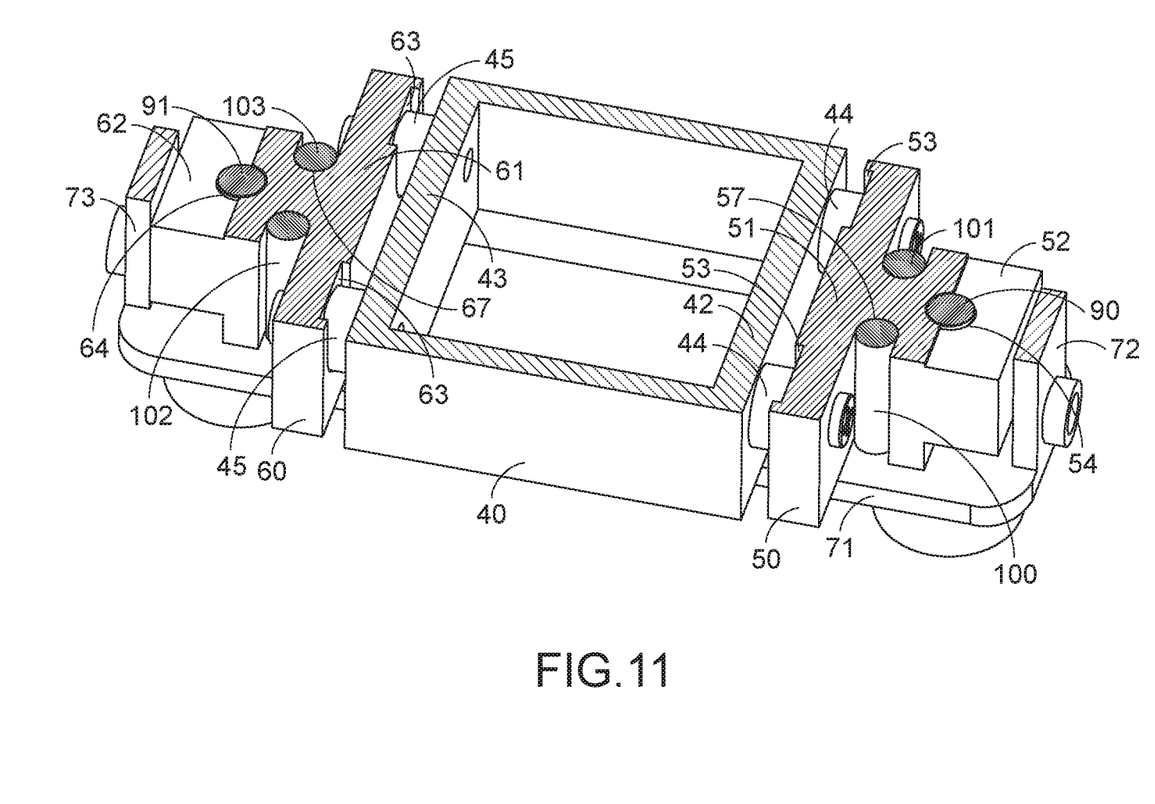
FIG. 11 is a schematic cutaway view illustrating the relationships between the first sliding block, the base, the second sliding block, the metallic guide tracks, the bolts and the bracket of the gaining controller as shown in FIG. 9 and taken along the line 11-11.

FIG. 11 is a schematic cutaway view illustrating the relationships between the first sliding block, the base, the second sliding block, the metallic guide tracks, the bolts and the bracket of the gaining controller according to embodiment of the present invention and taken along the line 11-11 of FIG. 9. Please refer to FIGS. 8, 9, 10 and 11. Firstly, a third through-hole 80 and a fourth through-hole 81 are formed in the first top structure 74 of the bracket 70, and a fifth through-hole 82 and a sixth through-hole 83 are formed in the second top structure 75 of the bracket 70. Moreover, a third pivotal hole 84, a fourth pivotal hole 85, a fifth pivotal hole 86 and a sixth pivotal hole 87 are formed in the bottom plate 71 of the bracket 70.

Correspondingly, the first sliding block 50 comprises a first guiding structure 57, and the second sliding block 60 comprises a second guiding structure 67. The first guiding structure 57 is arranged between the first clamping structure 51 and the first main body 52. The second guiding structure 67 is arranged between the second clamping structure 61 and the second main body 62. In an embodiment, the first guiding structure 57 and the second guiding structure 67 are concave structures.

In an embodiment, the gaining controller 1 further comprises a first metallic guide track 100, a second metallic guide track 101, a third metallic guide track 102 and a fourth metallic guide track 103. The first metallic guide track 100 and the second metallic guide track 101 are installed between the first top structure 74 and the bottom plate 71 of the bracket 70. The third metallic guide track 102 and the fourth metallic guide track 103 are installed between the second top structure 75 and the bottom plate 71 of the bracket 70.

Please refer to FIG. 8 again. After the first sliding block 50 and the second sliding block 60 are disposed within the bracket 70, the first metallic guide track 100 is penetrated through the third through-hole 80 and installed in the third pivotal hole 84, the second metallic guide track 101 is penetrated through the fourth through-hole 81 and installed in the fourth pivotal hole 85, the third metallic guide track 102 is penetrated through the fifth through-hole 82 and installed in the fifth pivotal hole 86, and the fourth metallic guide track 103 is penetrated through the sixth through-hole 83 and installed in the sixth pivotal hole 87. During the process of installing the first metallic guide track 100 and the second metallic guide track 101, the first guiding structure 57 of the first sliding block 50 is clamped between the first metallic guide track 100 and the second metallic guide track 101 (see FIG. 11). Similarly, during the process of installing the third metallic guide track 102 and the fourth metallic guide track 103, the second guiding structure 67 of the second sliding block 60 is clamped between the third metallic guide track 102 and the fourth metallic guide track 103 (see FIG. 11).

Due to the cooperation of the first metallic guide track 100, the second metallic guide track 101 and the first guiding structure 57, the first sliding block 50 can be moved upwardly or downwardly more stably. Similarly, due to the cooperation of the third metallic guide track 102, the fourth metallic guide track 103 and the second guiding structure 67, the second sliding block 60 can be moved upwardly or downwardly more stably.

In an embodiment, the bracket 70 is made of a metallic material. Consequently, after the first metallic guide track 100 is installed, the first metallic guide track 100 can be fixed in the third through-hole 80 or the third pivotal hole 84 by a welding means. Similarly, after the second metallic guide track 101 is installed, the second metallic guide track 101 can be fixed in the fourth through-hole 81 or the fourth pivotal hole 85 by a welding means. Similarly, after the third metallic guide track 102 is installed, the third metallic guide track 102 can be fixed in the fifth through-hole 82 or the fifth pivotal hole 86 by a welding means. Similarly, after the fourth metallic guide track 103 is installed, the fourth metallic guide track 103 can be fixed in the sixth through-hole 83 or the sixth pivotal hole 87 by a welding means.

In an embodiment, the gaining controller 1 further comprises a first motor 110 and a second motor 111. The first motor 110 is located under the first through-hole 76 to drive the rotation of the first bolt 90. The second motor 111 is located under the second through-hole 77 to drive the rotation of the second bolt 91. It is noted that numerous modifications and alterations may be made while retaining the teachings of the invention. For example, in another embodiment, the gaining controller comprises a single motor. The first bolt 90 and the second bolt 91 are driven by the motor through a general transmission mechanism (e.g., gears).

Please refer to FIG. 2 again. In an embodiment, the gaining controller 1 further comprises an adjusting switch 120. The adjusting switch 120 is exposed outside the casing 10. By operating the adjusting switch 120, the first motor 110 and the second motor 111 are controlled to drive the rotations of the first bolt 90 and the second bolt 91. Consequently, the vertical height of the operation module 20 is adjustable.

As mentioned above, the third pivotal hole 84, the fourth pivotal hole 85, the fifth pivotal hole 86 and the sixth pivotal hole 87 are formed in the bottom plate 71 of the bracket 70. In an embodiment, the third pivotal hole 84, the fourth pivotal hole 85, the fifth pivotal hole 86 and the sixth pivotal hole 87 are through-holes. In another embodiment, the third pivotal hole 84, the fourth pivotal hole 85, the fifth pivotal hole 86 and the sixth pivotal hole 87 are blind holes. Similarly, the first metallic guide track 100, the second metallic guide track 101, the third metallic guide track 102 and the fourth metallic guide track 103 can be installed in the third pivotal hole 84, the fourth pivotal hole 85, the fifth pivotal hole 86 and the sixth pivotal hole 87, respectively.

As mentioned above, the third through-hole 80 and the fourth through-hole 81 are formed in the first top structure 74 of the bracket 70, and the fifth through-hole 82 and the sixth through-hole 83 are formed in the second top structure 75 of the bracket 70. In another embodiment, the third through-hole 80, the fourth through-hole 81, the fifth through-hole 82 and the sixth through-hole 83 are placed by blind holes. After the first metallic guide track 100, the second metallic guide track 101, the third metallic guide track 102 and the fourth metallic guide track 103 are respectively penetrated through the third pivotal hole 84, the fourth pivotal hole 85, the fifth pivotal hole 86 and the sixth pivotal hole 87 in the bottom plate 71 of the bracket 70, the first metallic guide track 100, the second metallic guide track 101, the third metallic guide track 102 and the fourth metallic guide track 103 are respectively installed in the corresponding blind holes.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A gaming controller, comprising:
   a casing comprising an opening;
   a first sliding block comprising a first clamping structure and a first main body, wherein the first clamping structure comprises a first sliding groove, and the first main body comprises a first tapped hole;
   a second sliding block comprising a second clamping structure and a second main body, wherein the second clamping structure comprises a second sliding groove, and the second main body comprises a second tapped hole;
   an operation module, wherein a portion of the operation module is disposed within the casing, another portion of the operation module is exposed outside through the opening, and the operation module comprises a directional key and a base, wherein the directional key is installed on the base, the base is arranged between the first sliding block and the second sliding bock, and the base comprises a top wall, a first lateral wall and a second lateral wall, wherein the first lateral wall and the second lateral wall are connected with the top wall, the first lateral wall and the second lateral wall are opposed to each other, a first protrusion post is formed on the first lateral wall, the first protrusion post is installed in the first sliding groove, the second protrusion post is formed on the second lateral wall, and the second protrusion post is installed in the second sliding groove;
   a bracket, wherein the first sliding block, the second sliding block and the operation module are installed on the bracket, and the bracket comprises a bottom plate, a first lateral structure, a second lateral structure, a first top structure and a second top structure, wherein the first lateral structure is connected with the first top structure and the bottom plate, the second lateral structure is connected with the second top structure and the bottom plate, a first through-hole and a second through-hole are formed in the bottom plate, a first pivotal hole is formed in the first top structure, and a second pivotal hole is formed in the second top structure;
   a first bolt penetrated through the first through-hole and the first tapped hole, and tightened into the first pivotal hole; and
   a second bolt penetrated through the second through-hole and the second tapped hole, and tightened into the second pivotal hole,
   wherein as the first bolt and the second bolt are rotated, the first sliding block, the operation module and the second sliding block are moved upwardly or downwardly between the first top structure and the bottom plate or between the second top structure and the bottom plate.

2. The gaming controller according to claim 1, wherein the gaming controller further comprises a first metallic guide track, a second metallic guide track, a third metallic guide track and a fourth metallic guide track, wherein the first metallic guide track and the second metallic guide track are installed between the first top structure and the bottom plate, and the third metallic guide track and the fourth metallic guide track are installed between the second top structure and the bottom plate.

3. The gaming controller according to claim 2, wherein a third through-hole and a fourth through-hole are formed in the first top structure, a fifth through-hole and a sixth through-hole are formed in the second top structure, and a third pivotal hole, a fourth pivotal hole, a fifth pivotal hole and a sixth pivotal hole are formed in the bottom plate, wherein the first metallic guide track is penetrated through the third through-hole and installed in the third pivotal hole, the second metallic guide track is penetrated through the fourth through-hole and installed in the fourth pivotal hole, the third metallic guide track is penetrated through the fifth through-hole and installed in the fifth pivotal hole, and the fourth metallic guide track is penetrated through the sixth through-hole and installed in the sixth pivotal hole.

4. The gaming controller according to claim 3, wherein the bracket is made of a metallic material, the first metallic guide track is welded in the third through-hole or the third pivotal hole, the second metallic guide track is welded in the fourth through-hole or the fourth pivotal hole, the third metallic guide track is welded in the fifth through-hole or the fifth pivotal hole, and the fourth metallic guide track is welded in the sixth through-hole or the sixth pivotal hole.

5. The gaming controller according to claim 2, wherein the first sliding block further comprises a first guiding structure, and the second sliding block comprises a second guiding structure, wherein the first guiding structure is arranged between the first clamping structure and the first main body, the first guiding structure is clamped between the first metallic guide track and the second metallic guide track, the second guiding structure is arranged between the second clamping structure and the second main body, and the second guiding structure is clamped between the third metallic guide track and the fourth metallic guide track.

6. The gaming controller according to claim 5, wherein the first guiding structure and the second guiding structure are concave structures.

7. The gaming controller according to claim 1, wherein the gaming controller further comprises a first motor and a second motor, wherein the first motor is located under the first through-hole to drive rotation of the first bolt, and the second motor is located under the second through-hole to drive the rotation of the second bolt.

8. The gaming controller according to claim 7, wherein the gaming controller further comprises an adjusting switch, wherein the first motor and the second motor are controlled by operating the adjusting switch, and the adjusting switch is exposed outside the casing.

9. The gaming controller according to claim 1, wherein the first protrusion post and the second protrusion post are studs, a seventh through-hole is formed in the first sliding groove, an eighth through-hole is formed in the second sliding groove, and the gaming controller further comprises a first screw and a second screw, wherein after the first screw is penetrated through the seventh through-hole and fixed in the first protrusion post, the base is fixed on the first sliding block, wherein after the second screw is penetrated through the eighth through-hole and fixed in the second protrusion post, the base is fixed on the second sliding block.

10. The gaming controller according to claim 1, wherein the directional key comprises a keycap, a key frame and a circuit board, wherein an installation hole is formed in a bottom surface of the keycap, a pressing post is formed on the bottom surface of the keycap, the key frame comprises an accommodation space and a first stud, the keycap is disposed within the accommodation space, and the circuit board comprises a positioning structure and a switch element, wherein when the pressing post is pressed down, the switch element is triggered by the pressing post, wherein the base comprises a fixing post and a ninth through-hole, the fixing post is protruded from the top wall, the ninth through-hole is formed in the top wall, and the fixing post is inserted into the installation hole of the keycap, wherein the operation module further comprises a third screw, and the third screw is penetrated through the ninth through-hole and the positioning structure and fixed in the first stud, so that the key frame and the circuit board are fixed on the base.

* * * * *